United States Patent
Kim et al.

(10) Patent No.: US 6,289,049 B1
(45) Date of Patent: Sep. 11, 2001

(54) METHOD FOR CODING MOTION VECTOR IN MOVING PICTURE

(75) Inventors: Hyun Mun Kim, Seoul; Jong Beom Ra, Daejeon-si; Sung Deuk Kim, Taejeon-si; Young Su Lee, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/065,575

(22) Filed: Apr. 24, 1998

(30) Foreign Application Priority Data

Jul. 30, 1997 (KR) .................................................. 97-36230

(51) Int. Cl.$^7$ ..................................................... H04N 7/32

(52) U.S. Cl. .............................. 375/240.16; 375/240.24

(58) Field of Search .............................. 375/240, 240.01, 375/240.12, 240.16, 240.17, 240.13, 240.14, 240.15, 240.24; 348/384.1, 390.1, 400.1, 401.1, 402.1, 409.1, 415.1, 416.1, 699, 700; 382/232, 236, 238; H04N 7/32

(56) References Cited

U.S. PATENT DOCUMENTS

| | | | |
|---|---|---|---|
| 5,666,461 | * 9/1997 | Igarashi | 386/95 |
| 5,715,005 | * 2/1998 | Masaki | 348/416 |
| 5,886,742 | * 3/1999 | Hibi | 348/402 |
| 5,896,176 | * 4/1999 | Das | 348/416 |
| 5,905,535 | * 4/1999 | Kerdranvat | 348/416 |
| 6,005,980 | * 12/1999 | Eifrig | 382/236 |

FOREIGN PATENT DOCUMENTS

| | | |
|---|---|---|
| 0498938A2 | 11/1991 | (EP) . |
| 0707428A1 | 4/1996 | (EP) . |

OTHER PUBLICATIONS

Avideh Zakhor, "Iterative Procedures for Reduction of Blocking Effects In Transform Image Coding", IEEE Transactions On Circuits and Systems For Video Technology, vol. 2, No. 1, pp. 91–95 (Mar. 1992).

Yongyi Yang et al., "Regularized Reconstructions to Reduce Blocking Artifacts of Block Discrete Cosine Transform Compressed Images", IEEE Transactions On Circuits and Systems For Video Technology, vol. 3, No. 6, pp. 421–432 (Dec. 1993).

(List continued on next page.)

*Primary Examiner*—Richard Lee
(74) *Attorney, Agent, or Firm*—Fleshner & Kim, LLP

(57) ABSTRACT

A method for coding a motion vector in a moving picture reduces overall bit rates in a process of moving picture coding includes searching a motion vector prediction candidate for a first block among a plurality of blocks in a macroblock, searching a plurality of motion vector prediction candidates for each of additional blocks in the plurality of blocks in succession upon completion of the search for the plurality of motion vector prediction candidates for the first block. A motion vector median prediction value for the first block is compared to a motion vector bound. If the motion vector median prediction value is determined to lie within a motion vector bound, a predicted value for coding the first block is determined to be the motion vector median prediction value. If it is determined that the motion vector median prediction value does not lie within the motion vector bound, a vector value that lies within the bound of a motion vector prediction candidate among the plurality of motion vector prediction candidate or the motion vector median prediction value is determined to be the predicted value for coding the first block. The steps of comparing a motion vector median prediction value to the motion vector bound and determining a predicted value is repeated for each of the additional blocks in the plurality of blocks in the macroblock.

14 Claims, 9 Drawing Sheets

OTHER PUBLICATIONS

Gary J. Sullivan et al., "Motion Compensation for Video Compression Using Control Grid Interpolation", IEEE International Conference, pp. 2713–2716 (1991).

G. de Haan et al., "IC For Motion–Compensation 100Hz TV With Natural–Motion Movie–Mode", IEEE Transactions On Consumer Electronics, vol. 42, pp. 165–174 (Feb. 1996).

Taner Özcelik et al., "Image and Video Compression Algorithms Based on Recovery Techniques Using Mean Field Annealing", Proceedings of the IEEE, vol. 83, No. 2, pp. 304–316, Feb. 1995.

Yasuyuki Nakajima et al., "A PEL Adaptive Reduction of Coding Artifacts for MPEG Video Signals", pp. 928–932, IEEE, 1994.

* cited by examiner

+ integer pixel positions
○ half pixel positions
⊕ center of the search range of an 8×8 vector block 1 (MVD₁)

block 2 (MVD₂)

FIG.2c
background art block 3 (MVD$_3$)

FIG.2d
background art block 3 (MVD$_4$)

x a motion vector prediction value within a bound
○ motion vector predication candidates in a block
⊙ motion vector median predition value

FIG.5a

| sequence | Bits for $MVD_2$ coding(QP=10) | | | |
|---|---|---|---|---|
| | VM5.0 | embodiment of the present invention | | |
| | | THR=3.0(Saving) | THR=4.0(Saving) | THR=5.0(Saving) |
| Akiyo | 1813 | 1830 (−0.94%) | 1813 (0.00%) | 1813 (0.00%) |
| Container ship | 506 | 451 (10.87%) | 458 (9.49%) | 458 (9.49%) |
| Hall monitor | 3299 | 3224 (2.27%) | 3213 (2.61%) | 3223 (2.30%) |
| Mother&daughter | 5655 | 5323 (5.87%) | 5321 (5.91%) | 5374 (4.97%) |
| Coast guard | 11990 | 11727 (2.19%) | 11724 (2.22%) | 11772 (1.82%) |
| Foreman | 27488 | 23147 (15.79%) | 23497 (14.52%) | 23998 (12.70%) |
| Foreman(f_code=2) | 26620 | 22087 (17.03%) | 22279 (16.31%) | 22606 (15.08%) |
| News | 8993 | 8043 (10.56%) | 8167 (9.18%) | 8310 (7.59%) |
| Silent voice | 16292 | 13379 (17.88%) | 13522 (17.00%) | 13852 (14.98%) |
| Stefan | 32778 | 25339 (22.70%) | 25939 (20.86%) | 26564 (18.96%) |
| Stefan(f_code=2) | 27355 | 21349 (21.96%) | 21617 (20.98%) | 22006 (19.55%) |
| Bream | 16206 | 13367 (17.52%) | 13792 (14.90%) | 14192 (12.43%) |
| Child | 18157 | 15128 (16.68%) | 15430 (15.02%) | 15732 (13.36%) |
| Td | 15127 | 11956 (20.96%) | 12375 (18.19%) | 12634 (16.48%) |
| Weather | 5750 | 5610 (2.43%) | 5616 (2.33%) | 5625 (2.17%) |

F I G.5b

| sequence | Bits for $MVD_2$ coding(QP=20) | | | |
|---|---|---|---|---|
| | VM5.0 | embodiment of the present invention | | |
| | | THR=3.0(Saving) | THR=4.0(Saving) | THR=5.0(Saving) |
| Akiyo | 1646 | 1646 (0.00%) | 1646 (0.00%) | 1646 (0.00%) |
| Container ship | 700 | 667 (4.71%) | 674 (3.71%) | 674 (3.71%) |
| Hall monitor | 3537 | 3440 (2.74%) | 3443 (2.66%) | 3446 (2.57%) |
| Mother&daughter | 5565 | 5215 (6.29%) | 5212 (6.34%) | 5269 (5.32%) |
| Coast guard | 11205 | 10954 (2.24%) | 10943 (2.34%) | 11006 (1.78%) |
| Foreman | 26348 | 22344 (15.20%) | 22640 (14.07%) | 23090 (12.37%) |
| Foreman(f_code=2) | 25330 | 21203 (16.29%) | 21345 (15.73%) | 21660 (14.49%) |
| News | 8817 | 7939 (9.96%) | 8092 (8.22%) | 8224 (6.73%) |
| Silent voice | 15132 | 12508 (17.34%) | 12667 (16.29%) | 12933 (14.53%) |
| Stefan | 32675 | 25592 (21.68%) | 26239 (19.70%) | 26738 (18.17%) |
| Stefan(f_code=2) | 27526 | 22049 (19.90%) | 22286 (19.04%) | 22573 (17.99%) |
| Bream | 15720 | 13127 (16.49%) | 13486 (14.21%) | 13910 (11.51%) |
| Child | 18234 | 15393 (15.58%) | 15617 (14.35%) | 15917 (12.71%) |
| Td | 14090 | 11291 (19.87%) | 11554 (18.00%) | 11813 (16.16%) |
| Weather | 5833 | 5682 (2.59%) | 5699 (2.30%) | 5713 (2.06%) |

F I G.5c

| sequence | Bits for whole motion vector coding(QP=10) | | | |
|---|---|---|---|---|
| | VM5.0 | embodiment of the present invention | | |
| | | THR=3.0(Saving) | THR=4.0(Saving) | THR=5.0(Saving) |
| akiyo | 12597 | 12614(0.13%) | 12597(0.00%) | 12597(0.00%) |
| container ship | 11642 | 11587(0.47%) | 11594(0.41%) | 11594(0.41%) |
| hall monitor | 17665 | 17590(0.42%) | 17579(0.49%) | 17589(0.43%) |
| mother & daughter | 38444 | 38112(0.86%) | 38110(0.87%) | 38163(0.73%) |
| coast guard | 84059 | 83796(0.31%) | 83793(0.32%) | 83841(0.26%) |
| foreman | 139833 | 135492(3.10%) | 135842(2.85%) | 136343(2.50%) |
| foreman(f_code=2) | 138740 | 134207(3.27%) | 134399(3.13%) | 134726(2.89%) |
| news | 45913 | 44963(2.07%) | 45087(1.80%) | 45230(1.49%) |
| silent voice | 74022 | 71109(3.94%) | 71252(3.74%) | 71582(3.30%) |
| stefan | 158981 | 151542(4.68%) | 152142(4.30%) | 152767(3.91%) |
| stefan(f_code=2) | 142706 | 136700(4.21%) | 136968(4.02%) | 137357(3.75%) |
| bream | 93269 | 90430(3.04%) | 90855(2.59%) | 91255(2.16%) |
| child | 75613 | 72584(4.01%) | 72886(3.61%) | 73188(3.21%) |
| td | 82841 | 79670(3.83%) | 80089(3.32%) | 80348(3.01%) |
| weather | 29655 | 29515(0.47%) | 25921(0.45%) | 29530(0.42%) |

FIG.5d

| sequence | Bits for whole motion vector coding(QP=20) | | | |
|---|---|---|---|---|
| | VM5.0 | embodiment of the present invention | | |
| | | THR=3.0(Saving) | THR=4.0(Saving) | THR=5.0(Saving) |
| akiyo | 10771 | 10771(0.00%) | 10771(0.00%) | 10771(0.00%) |
| container ship | 10021 | 9988(0.33%) | 9995(0.26%) | 9995(0.26%) |
| hall monitor | 17211 | 17114(0.56%) | 17117(0.55%) | 17120(0.53%) |
| mother & daughter | 35349 | 34999(0.99%) | 34996(1.00%) | 35053(0.84%) |
| coast guard | 82715 | 82464(0.30%) | 82453(0.32%) | 82516(0.24%) |
| foreman | 136847 | 132843(2.93%) | 133139(2.71%) | 133589(2.38%) |
| foreman(f_code=2) | 135097 | 130970(3.05%) | 131112(2.95%) | 131427(2.72%) |
| news | 43343 | 42465(2.03%) | 42618(1.67%) | 42750(1.37%) |
| silent voice | 68465 | 65841(3.83%) | 66000(3.60%) | 66266(3.21%) |
| stefan | 159944 | 152861(4.43%) | 153508(4.02%) | 154007(3.71%) |
| stefan(f_code=2) | 144560 | 139083(3.79%) | 139320(3.62%) | 139607(3.43%) |
| bream | 92175 | 89582(2.81%) | 89941(2.42%) | 90365(1.96%) |
| child | 75615 | 72774(3.76%) | 72998(3.46%) | 15917(3.06%) |
| td | 77185 | 74386(3.63%) | 74649(3.29%) | 74908(2.95%) |
| weather | 29165 | 29014(0.52%) | 29031(0.46%) | 29045(0.41%) |

US 6,289,049 B1

METHOD FOR CODING MOTION VECTOR IN MOVING PICTURE

BACKGROUND OF THE INVENTION

1. Field of the Invention

The present invention relates to vector coding, and more particularly, to a method for coding a motion vector in a moving picture.

2. Background of the Related Art

An outline of an emerging Moving Picture Expert Group (MPEG) standardization MPEG-4 will now be described. The MPEG-4 pursues a technique different from the techniques of MPEG-1 and MPEG-2 previously used to cope with the current trend in which boundaries of techniques of communication, computer and broadcasting are removed and transformed into multimedia. That is, the object of MPEG-4 is a comprehensive technique that embraces each field of the above techniques and their independent technical innovations independently as well as the exploration of fields to which the new comprehensive technique is applicable. The directions that MPEG-4 pursues at large is a technique that allows an Audio and Video (AV) coding at an extra low bit rate.

To realize the technique that allows an AV coding at an extra low bit rate, the following techniques are suggested. First, a new coding technique in which the MPEG-1 and MPEG-2 DCT transform technique is not used, for example, the Wavelet coding system that has less distortion at block boundaries and a high coding efficiency. Second, a technique that conducts motion compensation in a manner other than the MPEG-1 and MPEG-2 block based motion compensation, which conducts the motion compensation by a macro block unit. Third, a region based coding technique inclusive of the contour coding technique and the object oriented coding technique. Fourth, a Fractal coding technique that can make a compression ratio over 1/1000.

Further, there are 8 new techniques that are not yet realized but are trying to be fully realized in MPEG-4. The eight new techniques include improvement of a coding efficiency, scaleability matching to a content, content handling and bit stream editing, improvement of tolerance for error, access to a multimedia data base, coding of a plurality of synchronous data, hybrid coding of natural data and synthesized data, and improvement of a random accessibility at an extra low bit rate.

A related art method for coding a motion vector will be explained with reference to FIGS. 1–3. FIG. 1 shows a motion vector bound of 8×8 motion vectors at an 8×8 mode macroblock. FIGS. 2a–2d illustrate definitions of candidate predictors for motion vectors in 8×8 mode macroblock. FIG. 3 illustrates an example of the case when a predicted motion vector median value lies outside of a bound.

In the emerging MPEG-4 standard, the 8×8 block search operation for integer pixel motion estimation is conducted within ±2 pixel search window centered on a 16×16 motion vector. Therefore, if a particular macroblock is searched in the 8×8 mode, all the motion vectors for 4 blocks in the macroblock will lie within a bound. The matrix shown in FIG. 1 shows the bound within which the 4 block motion vectors in the macroblock searched in the 8×8 mode can exist. This bound for the 4 motion vectors serves to improve a coding efficiency of motion vectors. Each of the motion vectors representing the 4 blocks in the bound is estimated as median values of neighboring three motion vector candidates, and the x and y components of the difference between the true and the estimated motion vectors, $MVD_X$ and $MVD_Y$, are variable-length coded, which is expressed as the following.

$Px$=Median($MV1x$, $MV2x$, $MV3x$), $Py$=Median($MV1y$, $MV2y$, $MV3y$), and $MVDx=MVx-Px$, $MVDy=MVy-Py$.

FIGS. 2a–2d illustrate motion vector candidates in a 8×8 mode according to an algorithm for estimation of a motion vector in MPEG-4. However, the motion vector estimation bound shown in FIG. 1 can not support an MPEG-4 Verification Model (VM) for the following reasons.

Referring to FIGS. 2a–2d, when the motion vector prediction candidates in the 8×8 mode macroblock are reviewed, cases exist when the motion vector prediction candidates of which median values are used for estimation of motion vectors lie outside of the bound of motion vectors in a 8×8 mode. Only the case of MV2 of block 2 is outside the bound of motion vectors in a 8×8 mode if the case of block 1 is excluded. As shown in FIG. 2b, only one of the three motion vector prediction candidates lies within the 8×8 mode macroblock. In this case, an absolute value of the MVD2 obtained from the predicted value of the median values may lie outside of a bound of 5.0. As shown in FIG. 3, when an MV of block 2 is denoted as $MV_{CurrentBlock}$ (a motion vector for respective block), an MV1 of block 2 is denoted as $Mv_{insideMBprediction}$ (a motion vector estimation within the bound), and a Median(MV1, MV2, MV3) of block 2 is denoted as $MV_{MedianPrediction}$, there is a case when the $MV_{MedianPrediction}$ lies on a point outside of the bound.

Therefore, the related art method for coding a motion vector has various disadvantages. The related art method for coding a motion vector in a moving picture has a problem of bit loss when an estimated value from medians lies outside of a bound.

SUMMARY OF THE INVENTION

An object of the present invention is to provide a method for coding a motion vector in a moving picture that substantially obviates one or more of the problems due to limitations and disadvantages of the related art.

Another object of the present invention is to provide a method for coding a vector that prevents an increase in bit rate when a predicted vector lies outside a bound.

A further object of the present invention is to provide a method for coding a moving vector in a motion picture that reduces the bit rate.

A still further object of the present invention is to provide a method for coding a moving vector that reduces bit loss.

To achieve these and other advantages in whole or in parts and in accordance with the purpose of the present invention, as embodied and broadly described, a method for coding a motion vector in a moving picture includes searching a first, a second and a third motion vector prediction candidates for a block 1 among 4 8×8 blocks in a macroblock when a search mode for the macroblock is selected to be an 8×8 mode, searching a first, a second and a third motion vector prediction candidates MV1, MV2 and MV3 for each of block 1, block 2, block 3 and block 4 in succession, comparing a notion vector median prediction value $MV_{MedianPrediction}$ for the block 1 to a motion vector bound, determining the motion vector median prediction value as a predicted value for coding the block 1 if the motion vector median prediction value lies within the bound, determining a vector value that lies within the bound of a motion vector prediction candidate among the first, the second and the third motion vector prediction candidates or a motion vector median prediction value as a predicted value PMV for coding the block 1 if the motion vector median prediction value does not lie within the bound, and repeating the step of comparing a motion vector median prediction value to a motion vector bound and determining a predicted value for the entire 8×8 blocks in the macroblock.

To further achieve these and other advantages in whole or in parts and in accordance with the purpose of the present invention, as embodied and broadly described, a method for coding a motion vector includes selecting a motion vector median prediction value for a current block of the plurality of blocks in a macroblock to be a predicted value if the motion vector median prediction value lies within a bound, selecting one of a vector value of a motion vector prediction candidate that lies within the motion vector from the plurality of motion vector prediction candidates for the current block and the motion vector median prediction value to be the predicted value and performing the selecting steps for said each of the plurality of blocks.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 2a–2d are diagrams that illustrate definitions of candidate predictors for motion vectors in 8×8 mode macroblock;

FIG. 5a–5d are diagrams that illustrate tables of bit rate changes using the motion vector coding according to a preferred embodiment of the present invention.

DETAILED DESCRIPTION OF PREFERRED EMBODIMENTS

A preferred embodiment of a method for coding motion vectors according to the present invention will now be described. When an estimation based on median values lies outside of a bound, an expected bit amount produced when an $MV_{MedianPrediction}$ or $MV_{InsideMBPrediction}$ is used as a predictor can be determined as follows:

Expected bit amount $(E(R(MV_{CurrentBlock}-MV_{MedianPrediction}))=$
$(R(0.5)+R(1.0)+R(1.5)+R(2.0)+R(2.5)+R(3.0)+,\ldots,+R(10.5))/21=$ $(3+4+5+7+3*10+11*11)/21=194/21=9.238$(when f_code=1), $(2*4+2*5+2*6+2*8+6*9+6*11+12)/21=178/21=8.476$(when f_code=2), $(4*5+4*6+4*7+4*9+5*10)/21=154/21=7.333$(when f_code=3).

Expected bit amount $E(R(MV_{Current\ Block}-MV_{InsideMBPrediction}))=$
$(R(0)+2*(R(0.5)+R(1.0)+R(1.5)+,---,+R(5.0)))/21=$ $(1+2*(3+4+5+7+3*8+3*10))/21=147/21=7$(when f_code=1),
$(1+2*(2*4+2*5+2*6+2*8+2*9))/21=129/21=6.143$(when f_code=2), $(1+2*(4*5+4*6+2*7))/21=117/21=5.571$(when f_code=3).

In the above calculations, R(MVD) is an amount of bit produced of MVD and an $MV_{CurrentBlock}$ is assumed to have a uniform probability distribution within the bound. In view of probability, there is about an increase of two bits in each component for every f_code when $MV_{MedianPrediction}$ lies outside of the vector bound.

Figure 1:
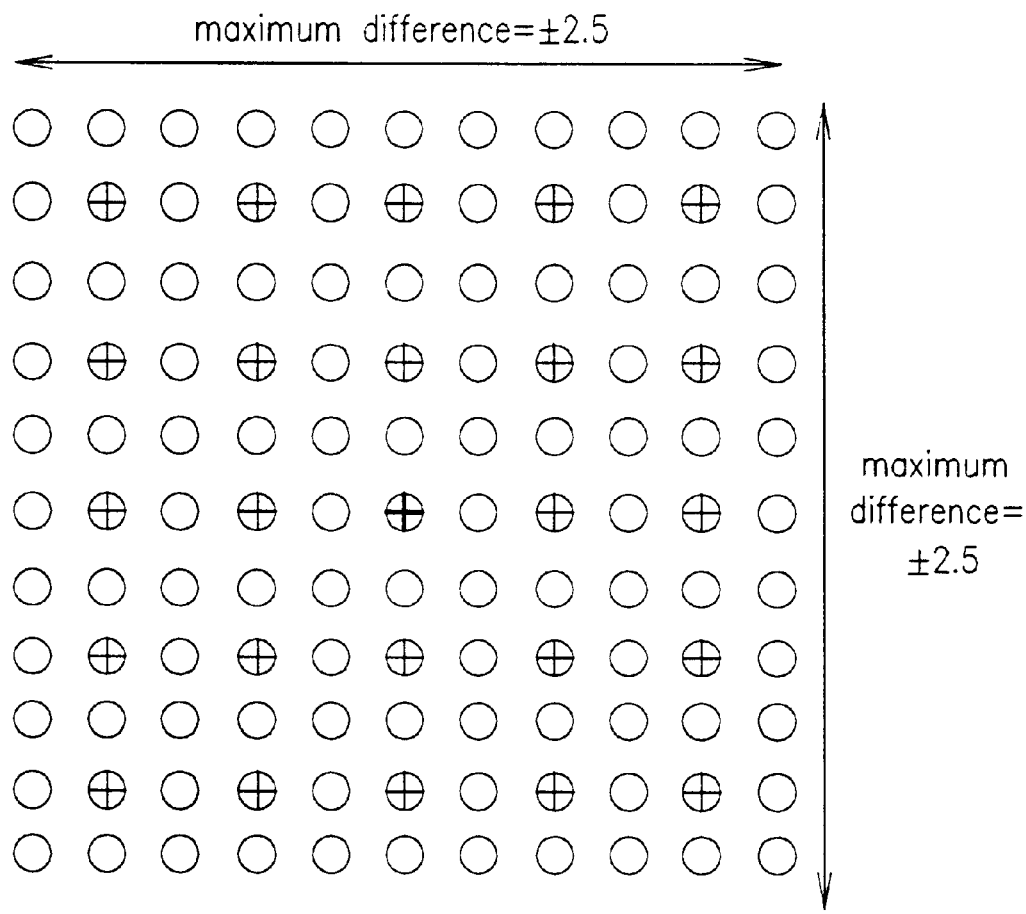
FIG. 1 is a diagram that illustrates a matrix showing a motion vector bound of 8×8 motion vectors at an 8×8 mode macroblock.
Figure 2A:
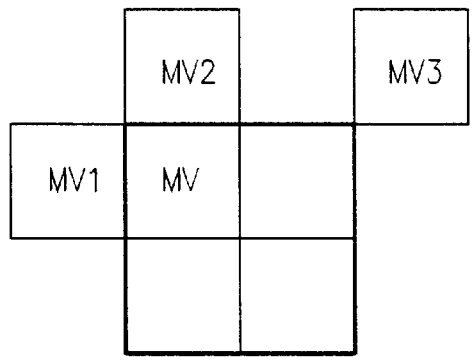
Figure 2B:
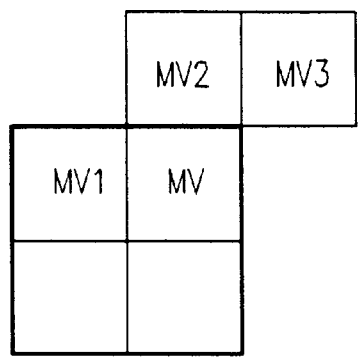
Figure 3:
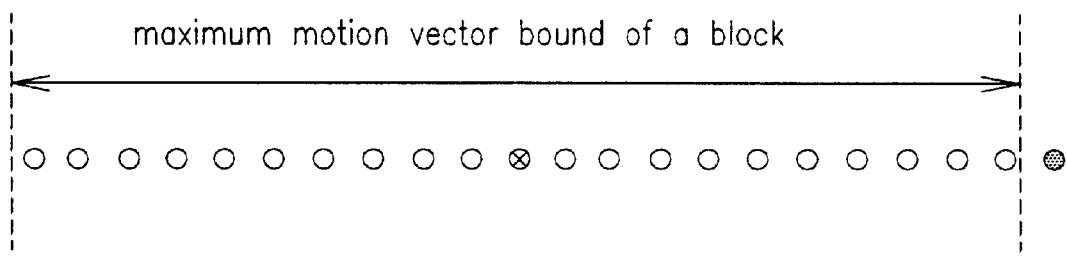
FIG. 3 is a diagram that illustrates a predicted median value of a motion vector.

The method for coding a motion vector according to the preferred embodiment of the present invention prevents the increase of bits when $MV_{MedianPrediction}$ lies outside of the vector bound. When $MV_{MedianPrediction}$, which is used as a median predictor lies outside of the vector bound, $MV_{InsideMBPrediction}$ is selectively used. That is, the portions selected for motion vector prediction (PMV) for a case outside of the bound (e.g. the block 2 shown in FIG. 2b) are preferably changed as follows:

PMV=Median(MV1, MV2, MV3), if(ABS(PMV-MV1)>THR),
PMV=MV1, where THR denotes an actual motion vector bound in an 8×8 mode and maximum value of THR is preferably 5.0.

A case of the motion vector prediction candidate lying outside of the bound is most probably the case of the second 8×8 block (e.g., block 2 shown in FIG. 2b) in the current MPEG-4 standard. Therefore, in the preferred embodiment of a method for coding motion vectors, comparing THR to ABS(PMV-MV1) is preferably used only the case of block 2.

Figure 4:
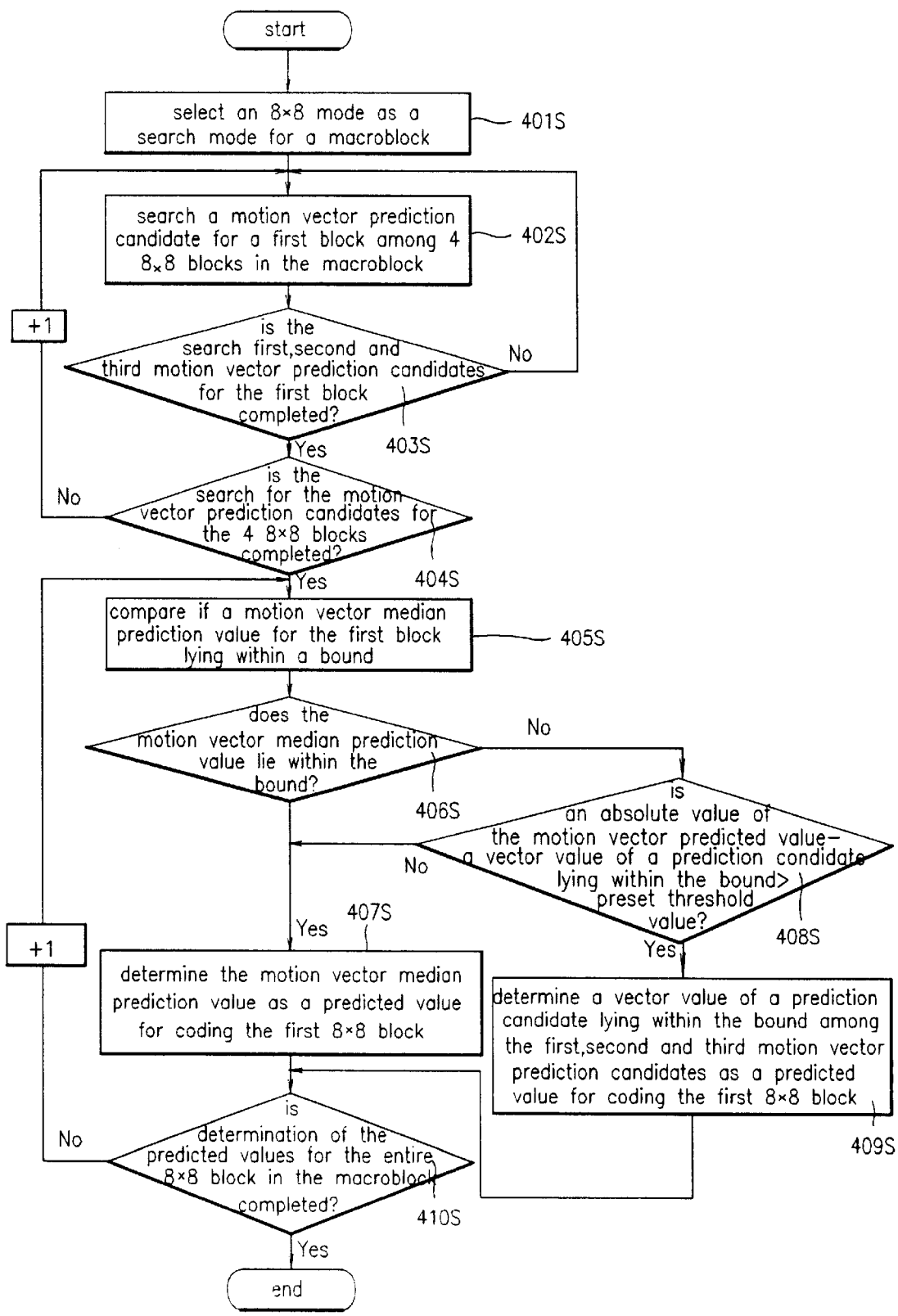
FIG. 4 is a flow chart that illustrates coding a motion vector according to a preferred embodiment of the present invention.

FIG. 4 illustrates a flow chart showing an exemplary process steps for coding a motion vector in accordance with the preferred embodiment of the present invention. Referring to FIG. 4, a process starts and continues to step 401S. In step 401S, an 8×8 mode is selected as a search mode of a macroblock for coding a motion vector. From step 401S, control continues to step 402S.

In step 402S, a block (e.g., initial block 1) of the 4 8×8 blocks in the macroblock is searched for a motion vector prediction candidate. From step 402S, control continues to step 403S. In step 403S, completion of the search of the first, second and third motion vector prediction candidates for the current block (e.g., block 1) is determined. If the determination in step 403S is negative, control returns to step 402S. If it is determined in step 403S that the search of the first, second and third motion vector prediction candidates for the current block is finished, control continues to step 404S.

In step 404S, completion of the search of all blocks (e.g., the four 8×8 blocks) for a respective motion vector prediction candidate is determined. If it is determined in step 404S that the search for motion vector candidates for the 4 8×8 blocks is complete, control continues to step 405S. However, if the determination in step 404S is negative, a current block being searched is incremented by 1 (e.g., from block 1 to block 2) and control returns to step 402S. Thus, the searches of the 8×8 block 1, block 2, block 3, and block 4 for the first, second and third motion vector prediction candidates MV1, MV2 and MV3 for each of the blocks are conducted in succession.

In step 405S, the motion vector median prediction value $MV_{MedianPrediction}$ for an 8×8 block (e,.g., the first block) is compared to the motion vector bound. From step 405S, control continues to step 406S. In step 406S, whether the motion vector median prediction value $MV_{MedianPrediction}$ is within the motion vector bound is determined. If the determination in step 406S is affirmative, control continues to step 407S. In step 407S, the motion vector median prediction value $MV_{MedianPrediction}$ is determined to be a prediction value for coding the corresponding (e.g., block 1) 8×8 block. If the determinination in step 406S is negative (not within the bound), control continues to step 408S.

In step 408S, an absolute value of the motion vector median value minus the vector value of the prediction candidate is compared to a preset threshold value THR. As a result of the comparison, if found the preset threshold value THR is smaller, of the first, second and third motion vector prediction candidates, the vector value of the prediction candidates that lies within the bound is taken as a prediction value for coding the corresponding 8×8 block. If the preset threshold value THR is larger, a motion vector median prediction value is taken as a prediction value for coding the corresponding 8×8 block. In other words, if the determination in step 408S is negative, control continues to step 407S. If the determination in step 408S is affirmative, control continues to step 409S. In step 409S, a vector value of a prediction candidate lying within the bound among the first, second and third motion vector prediction candidates is determined as a predicted value for coding a current 8×8 block.

From steps 407S and 409S, control continues to step 410S. In step 410S, a determination is made whether predicted values for all 8×8 blocks in the macroblock are complete. If the determination in step 410S is negative, the current block is incremented and control returns to step 405S. If the determination in step 410S is affirmative, the process ends. Thus, the steps (e.g., steps 405S–409S) in which a motion vector median prediction value is determined within a bound and a preset threshold value THR is compared to determine a prediction value is repeated for all blocks (e.g., sub-blocks or 8×8 blocks) in the macroblock in question. Upon determination of a prediction value, a differential of the prediction values for the entire motion vectors are coded.

As described above, the preferred method for coding a motion vector in a moving picture of the present invention prevents an increase of a bit amount when an $MV_{MedianPrediction}$ lies outside of a motion vector bound when an 8×8 mode is selected. In other words, the increase of bit amount in coding is prevented by using $MV_{InsideMBPrediction}$ when the $MV_{MedianPrediction}$, which is used as a median predictor, is outside of a preset threshold value THR.

The preferred embodiment of a method for motion vector coding described with respect to FIG. 4 uses a 16×16 macroblock and a 8×8 search mode. However, the present invention is not intended to be limited to this. Alternative sized macroblocks and various search modes can also be used.

An exemplary apparatus using a motion vector coding technique according to a preferred embodiment of the present invention will now be described. FIGS. 5a–5d illustrates a number of bits in an actual motion vector coding using the preferred embodiment of a method for motion vector coding under the following conditions. First, a quantization parameter QP is fixed for each sequence, and a motion vector of a skipped macroblock is not included in the determination. Second, a sequence resolution format in an advanced prediction mode is a Quarter Common Intermediate Format (QCIF)(176×144) with a frame rate of 10 Hz (300 frames). Third, an f_code=1(range of MV search: −16.0~+15.5), and the No shape coding (rectangular) is used as a coding technique.

The tables in FIGS. 5a and 5b respectively illustrate results when a block (MVD2) has a motion prediction value lying outside of a bound according to the prediction value determination of the preferred embodiment of the present invention. FIG. 5a shows a case of QP=10 and FIG. 5b shows a case of QP=20. The tables in FIGS. 5c and 5d respectively illustrate results when the entire motion vectors are coded. FIG. 5c shows a case of QP=10 and FIG. 5d shows a case of QP=20. Thus, as shown in FIGS. 5a–5d, the preferred embodiment of a method of a motion vector coding is more efficient (e.g. an increase of number of bits is prevented) than an MPEG-4 video VM 5.0, enough to apply to VM 6.0.

The method for coding a motion vector in moving picture of the present invention has an advantage of reducing a required number of bits to code the motion vector by preventing an increase of a number of bits by using, for example, an $MV_{InsideMBPrediction}$ as a prediction value when an $MV_{MedianPrediction}$ used, for example, as a median predictor lies outside of a preset bound.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for coding a motion vector in a moving picture, the method comprising:

searching a plurality of motion vector prediction candidates for a first block among a plurality of blocks in a macroblock;

searching a plurality of motion vector prediction candidates for each of additional blocks of the plurality of blocks;

comparing a motion vector median prediction value for the first block to a motion vector bound, and wherein a motion vector predicted value for coding the first block is determined to be the motion vector median prediction value when the motion vector median prediction value lies within the motion vector bound, wherein the motion vector predicted value for coding the first block is determined to be at least one of a vector value that lies within the motion vector bound of a motion vector prediction candidate among the plurality of motion vector prediction candidates and the motion vector median prediction value when the motion vector prediction candidates are outside the motion vector bound, and wherein when the motion vector median prediction value is outside the motion vector bound for a current block, the comparing comprises, comparing an absolute value of the motion vector prediction median value minus a vector value of a prediction candidate lying within the motion vector bound to a prescribed threshold value, determining the vector value of the motion vector prediction candidate among the plurality of motion vector prediction candidates within the motion vector bound to be the motion vector predicted value for coding the current block when the prescribed threshold value is smaller, and determining the motion vector median prediction value to be the motion vector predicted value when the prescribed threshold value is larger; and, repeating the step of comparing a motion vector median prediction value for the additional blocks in the plurality of blocks.

2. The method of claim 1, wherein the motion vector bound has a maximum value of 5.0.

3. The method of claim 1, wherein the prescribed threshold value is smaller for a second searched block in the macroblock according to prescribed motion vector prediction candidates.

4. The method of claim 1, wherein the prescribed threshold value is smaller for a second block in the macroblock according to a motion vector prediction candidate standard search.

5. The method of claim 1, wherein a search mode for the macroblock is 8×8, and wherein the plurality of blocks is 4 8×8 blocks in the macroblock.

6. A method for coding a motion vector, comprising:

selecting a motion vector median prediction value for a current block of a plurality of blocks in a macroblock to be a predicted value if the motion vector median prediction value lies within a bound;

selecting one of a vector value of a motion vector prediction candidate that lies within the bound from a plurality of motion vector prediction candidates for the current block and the motion vector median prediction value to be the predicted value, wherein when the motion vector median prediction value is outside the bound, the step of selecting comprises, comparing an absolute value of a motion vector median prediction value minus a vector value of a prediction candidate lying within the bound to a prescribed threshold value, and determining the motion vector median prediction value to be the predicted value when the prescribed threshold value is larger; and performing the selecting steps for each of the plurality of blocks in the macroblock.

7. The method of claim 6, wherein when the motion vector median prediction value is outside the bound, the selecting one comprises:

determining the vector value of the motion vector prediction candidate within the bound from the plurality of motion vector prediction candidates to be the predicted value when the prescribed threshold value is smaller.

8. The method of claim 6, wherein the prescribed threshold value has a maximum value of 5.0.

9. The method of claim 6, wherein the prescribed threshold value is smaller for a second searched block in the macroblock according to prescribed motion vector prediction candidates for the current block.

10. The method of claim 6, further comprising:

successively searching for the plurality of motion vector prediction candidates for said each of the plurality of blocks in the macroblock; and determining the motion vector median prediction value for said each of the plurality of blocks based on the corresponding plurality of motion vector prediction candidates.

11. The method claim 6, wherein the searching step searches in an 8×8 search mode.

12. The method of claim 6, further comprising coding said each of the plurality of blocks based on the predicted value, wherein a coding bit rate is reduced.

13. The method of claim 6, wherein the macroblock is 16×16, each of 4 blocks in the plurality of blocks is 8×8, and wherein the plurality of motion vector prediction candidates is 3.

14. The method of claim 6, wherein the predicted value is a motion vector predicted value for coding the current block.

* * * * *